(12) United States Patent
Cameron

(10) Patent No.: US 6,434,592 B1
(45) Date of Patent: Aug. 13, 2002

(54) METHOD FOR ACCESSING A NETWORK USING PROGRAMMED I/O IN A PAGED, MULTI-TASKING COMPUTER

(75) Inventor: Don Cameron, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,647

(22) Filed: Jan. 5, 1998

(51) Int. Cl.$^7$ ................................................. G06F 9/00
(52) U.S. Cl. ...................... 709/108; 709/313; 709/232; 710/59
(58) Field of Search .................. 395/677, 678; 712/228; 709/200, 107, 231, 202, 108, 310, 313, 232; 710/1, 20, 33, 59

(56) References Cited

U.S. PATENT DOCUMENTS

| | | | | |
|---|---|---|---|---|
| 4,275,440 A | * | 6/1981 | Adams, Jr. et al. | 710/48 |
| 4,371,932 A | * | 2/1983 | Dinwiddie, Jr. et al. | 710/21 |
| 4,855,899 A | * | 8/1989 | Presant | 710/36 |
| 5,206,935 A | * | 4/1993 | Sinks et al. | 710/29 |
| 5,379,381 A | * | 1/1995 | Lamb | 710/6 |
| 5,805,823 A | * | 9/1998 | Seitz | 709/229 |
| 5,887,134 A | * | 3/1999 | Ebrahim | 709/200 |
| 6,009,472 A | * | 12/1999 | Boubou et al. | 709/232 |

OTHER PUBLICATIONS

Vercauteren, Steven et al. "A Strategy for Real–Time Kernel Support in Application–Specific HW/SW Embedded Architectures." 1996. ACM.*

Geiger, Willi. "Computer Input/Output" Jan. 31, 1996. p. 1–4.*

Taylor, Jeff. "Bus mastering SCSI controllers—A new generation of desktop I/O" Nov. 1995, p. 1–3.*

* cited by examiner

Primary Examiner—St. John Courtenay, III
Assistant Examiner—Lewis A. Bullock, Jr.
(74) Attorney, Agent, or Firm—Blakely, Sokoloff, Taylor & Zafman LLP

(57) ABSTRACT

A method for sending a message from an application in one networked multi-tasking, paged computer to an application in another networked multi-tasking computer using programmed I/O. A communication link is first established between the two applications. The sending application then begins polling the communication link to determine when the communication link is available to send a message. When the communication link is available, the hardware associated with the sending application receives bytes of information until the application has been swapped out by an operating system or until the entire message has been received. If the entire message has been received, then it is sent to the other application. However, when the application is swapped out, the hardware sends the portion of the message that has already been received to the other application and continues retrieving information when the application is swapped back in.

15 Claims, 9 Drawing Sheets

METHOD FOR ACCESSING A NETWORK USING PROGRAMMED I/O IN A PAGED, MULTI-TASKING COMPUTER

FIELD OF THE INVENTION

The present invention relates to the field of computer networking. More particularly, the invention describes a method for accessing a network with extremely low latency using a programmed I/O in a paged, multi-tasking computer.

BACKGROUND OF THE INVENTION

In a networked computer system, there is often a need for information to be transmitted from application software in one computer across the network and be received and used by application software in a different computer. During this transmission and receipt process, the information has many hardware and software layers which it must pass through. For example, in a typical networked computer 210, as shown in FIG. 2, for information to be transmitted from the application software 211 to the network 200, it must travel through software layers such as a library 212, an operating system (O/S) 213, and a driver (in the O/S) 214 as well as other hardware 214. Similarly, in order for the application software 221 of the second computer 220 to retrieve the information, the information must travel through components such as hardware 225, a driver 224, an operating system (O/S) 223 and a library 222 before reaching the destination application software 221. The process of the information traveling through these various hardware and software layers takes a significant amount of time, typically around 100 µs or more.

In the past, data transmission over the network was slow compared to the transmission of data from the application software to the network (as described above, this takes around 100 µs or more). However, the speed at which data can be transmitted over the network has been increasing. As the network speed becomes faster, the overhead time associated with the data traveling to or from the network to the application software has proportionally become greater. Therefore, decreasing the overhead time associated with the data traveling to and from the network has become of increasing concern.

In order to share hardware devices among tasks on a multitasking computer, the operating system kernel is typically the only entity allowed to directly interface with them. User tasks interface with hardware devices indirectly by invoking kernel software functions. Over time the performance of network hardware devices has increased relative to the overhead of the kernel software such that it is not possible to take advantage of the increasing speed of the network. In order to provided shared access to a single network hardware device from number of tasks certain problems to be overcome. First, a task message must not interface with message from another task. Second, tasks must not be able to receive into or send out of memory regions that are not their own. Third, on a computer which supports paged virtual memory, tasks must not be able to receive into or send out of virtual memory regions that are not currently resident in physical memory.

Solutions to these problems have been proposed for network hardware devices which employ DMA (Direct Memory Access). FIG. 3 shows one known method of decreasing the overhead time using a DMA transfer. Using DMA, a device (such as hardware, floppy disk drive, CD-ROM, etc.) can transfer data directly to the computer's memory 310, thereby bypassing the CPU 340. In general, a DMA is a specialized processor (a DMA controller 330) that transfers data between memory 310 and an I/O device 360, while the CPU 340 goes on with other tasks. Thus, it is external to the CPU 340 and must act as a master on the bus. To use DMA, a program only needs to tell the DMA controller 330 how many bytes should be transferred (length) 332 and from what address location (source address) 333 to another address location (destination address) 334. The DMA controller 330 then goes and grabs the information, or message, out of the memory 310.

One issue in using DMA is whether the DMA controller 330 should transfer data using virtual addresses or physical addresses. If the DMA uses physically mapped I/O, then transferring a buffer that is larger than one page will cause a problem because the pages in the buffer will not usually be mapped to sequential pages in physical memory. For example, suppose a DMA is ongoing between memory and a frame buffer, and the operating system removes some of the pages from memory, or relocates them. The DMA would then be transferring data to or from the wrong page of memory. A typical solution to this problem is to use a virtual DMA controller 331. A virtual DMA controller 331 allows use of virtual addresses that are mapped to physical addresses during the DMA. Thus, a buffer must be sequential in virtual memory but the pages can be scattered in physical memory. The operating system can then update the address tables of a DMA if a process is moved using virtual DMA, or the operation system can "lock" the pages in memory until the DMA is complete. However, keeping the DMA up to date is quite difficult. Therefore, one problem with using a DMA is that it is quite complicated and takes a lot of hardware support. In addition, the DMA controller in a computer is usually inflexible and slow. Therefore a simpler and faster solution is desirable.

FIG. 4 shows another known method of decreasing the overhead time. This method is called programmed I/O, and is often used in single-tasking computers. In this method, the application software 411 bypasses software layers, such as the library 412, O/S 413, and the driver 414, and sends the data directly to the hardware 415, using the CPU (not shown) for data transfers. In a system using programmed I/O, the application software 411 essentially pushes the message to be sent directly into the hardware 415. This method requires that the CPU (not shown) first check to see if the I/O port needing a data transfer has the data ready. If the I/O port is ready then the data is transferred to the memory. One advantage of programmed I/O over DMA is that it is not necessary to worry about keeping track of virtual and physical memory locations. In programmed I/O, since the CPU is used, the synchronization required in DMA is not necessary and therefore implementation is simpler. If an application attempts to retrieve data out of memory belonging to someone else, the CPUs built in safety measures, such as an address fault, comes into play.

In addition, programmed I/O is typically faster than DMA as it reduces the overhead time used to get from a user task to the network, but has been limited to single-tasking computers. The reason for this is because of the fact that in multi-tasking computers, an application runs for a certain quantum of time, and is then swapped out, while another application runs. This typically occurs about ten times per second. In the situation in which an application is in the middle of sending a message and the asynchronous halt comes there needs to be some way of dealing with this situation.

SUMMARY OF THE INVENTION

A method for sending a message from an application in one networked multi-tasking, computer to an application in another networked multi-tasking computer using programmed I/O. A communication link is first established between the two applications. When the communication link is available, the hardware associated with the sending application receives bytes of information until the application has been swapped out by the operating system or until the entire message has been received. If the entire message has been received, then it is sent to the other application. However, when the application is swapped out, the hardware sends the portion of the message that has already been received to the other application and continues retrieving information when the application is swapped back in.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
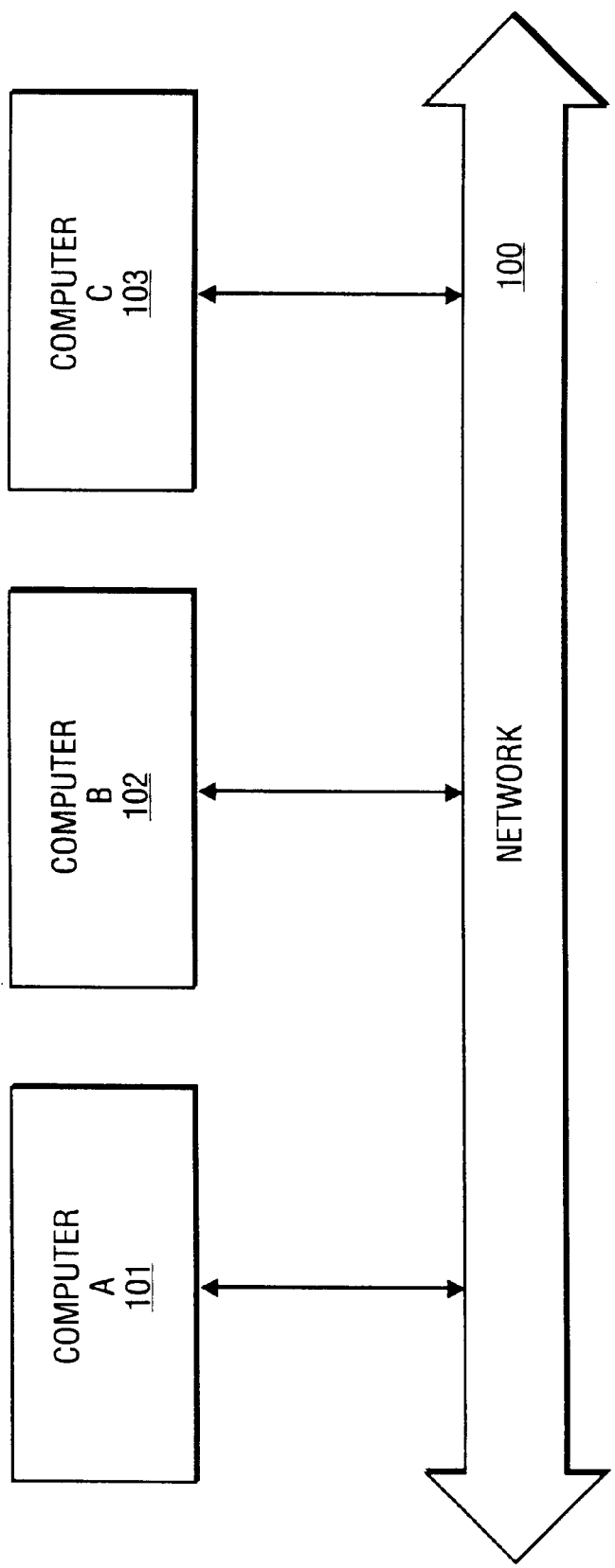
FIG. 1 is a block diagram of a networking system in which the present invention may be implemented.
Figure 2:
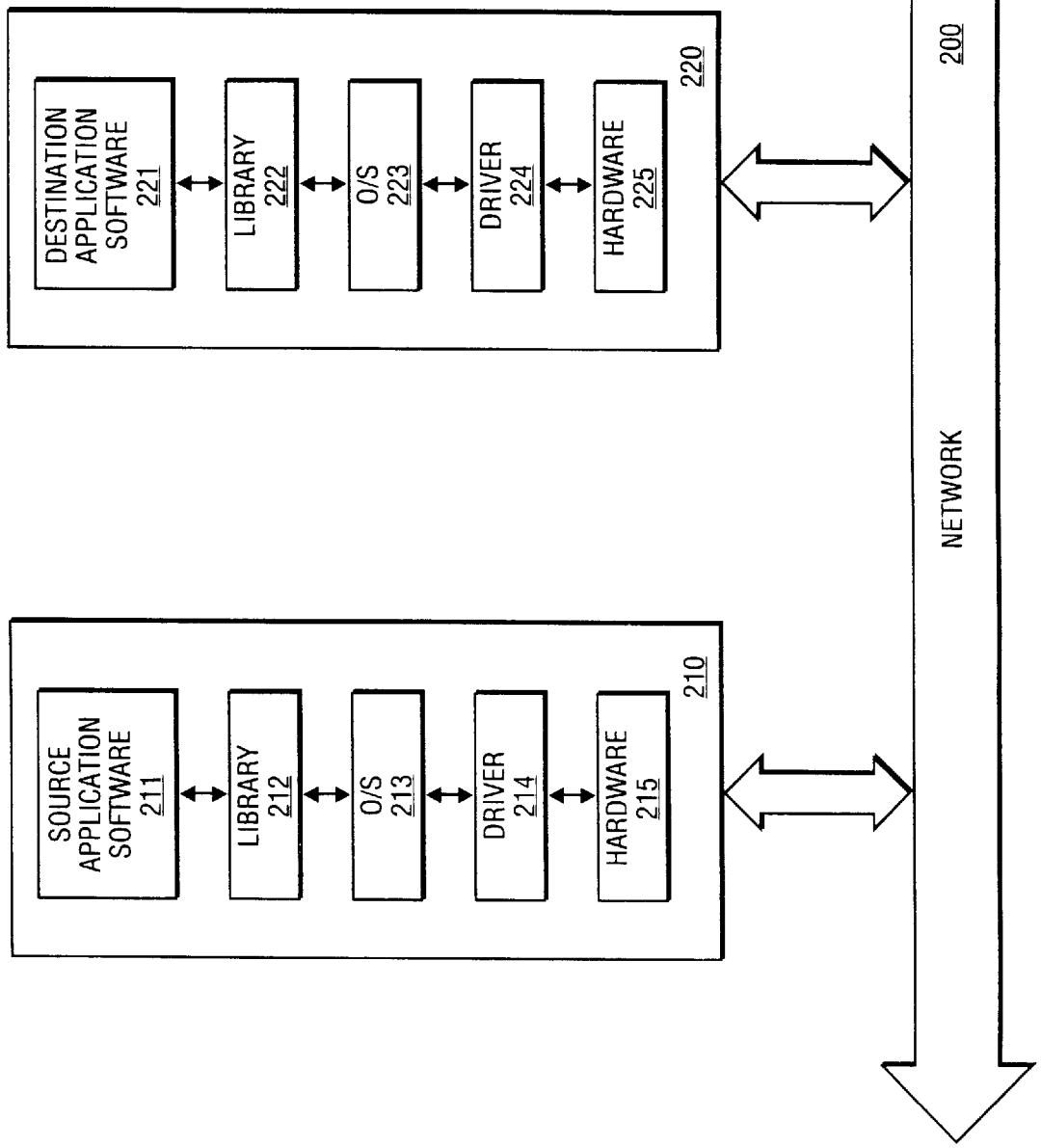
FIG. 2 is a block diagram of a prior art networking system showing some typical hardware and software layers which data must travel through when being sent from the source application software to the destination application software via the network.
Figure 3:
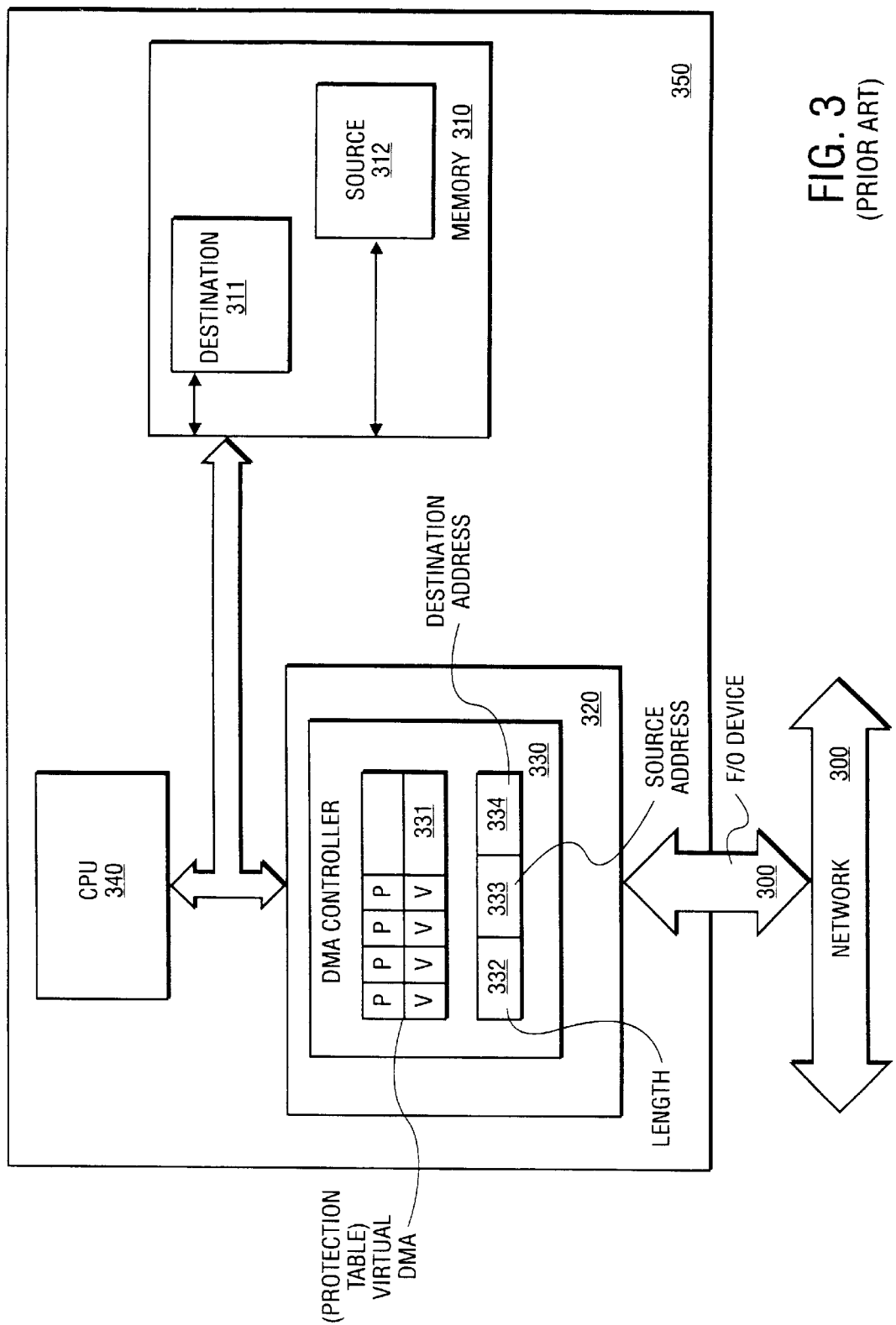
FIG. 3 is a block diagram of a prior art networked computer using Direct Memory Access (DMA) for transferring data from the application software to the network.
Figure 4:
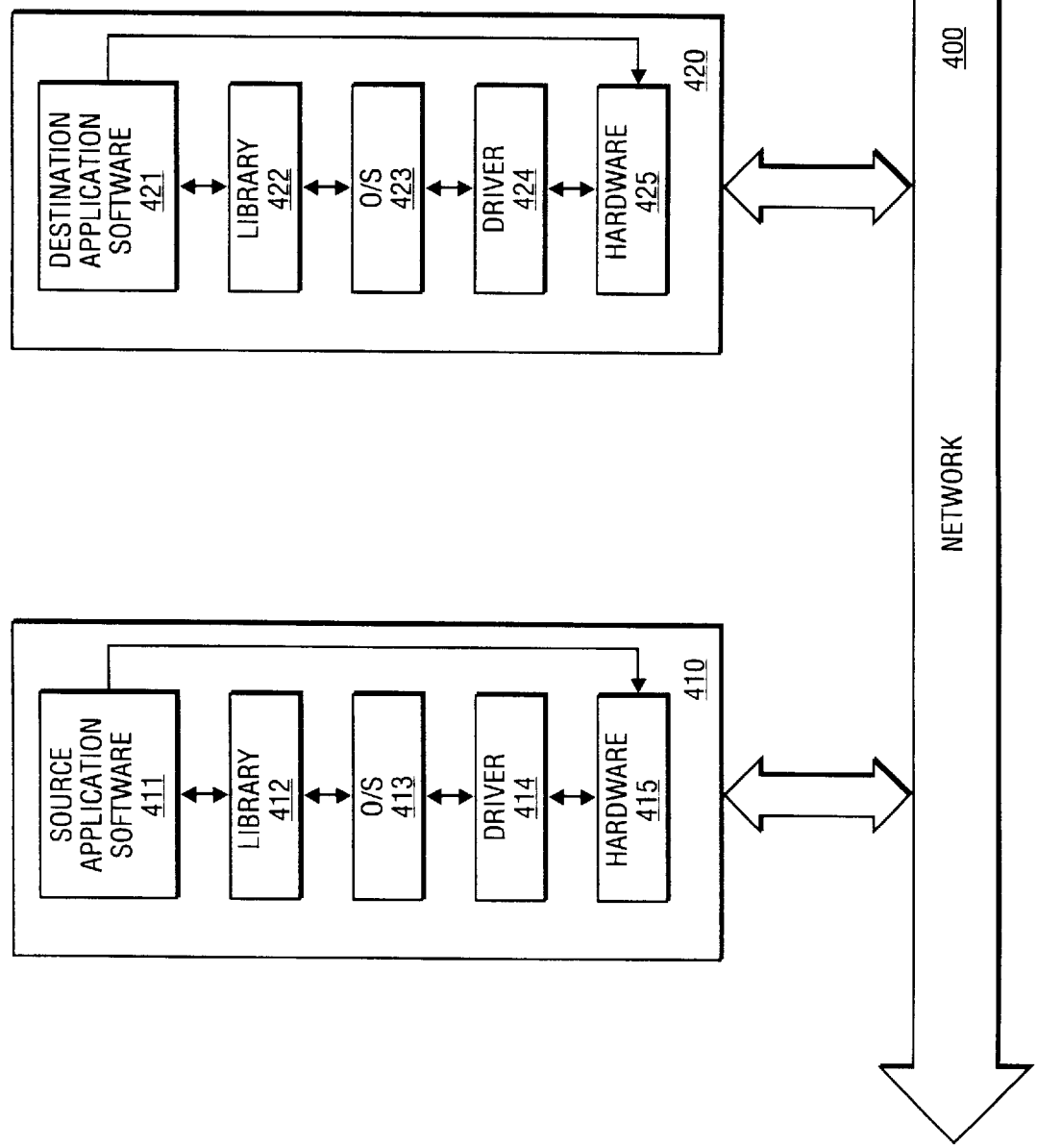
FIG. 4 is a block diagram of a prior art networking system using programmed I/O in a single-tasking computer in order to bypass some hardware or software layers.

In a networked computer system such as that shown in FIG. 1, information from one computer often must be transferred to another computer. As described above, two known methods for transferring this information while attempting to minimize the overhead time associated with the transfer are DMA and Programmed I/O. However, as discussed above, both of the above solutions have limitations. DMA can be used on multi-tasking computers, but is complicated and slow. Alternatively, programmed I/O, although simple and faster, has been limited to single-tasking computers. Therefore, it is desirable to take advantage of the simplicity of programmed I/O, but to expand it to be used in the area of multi-tasking computers. Through the use of programmed I/O, the network hardware is simplified and the overhead to get from a user task to the network is reduced.

Figure 5A:
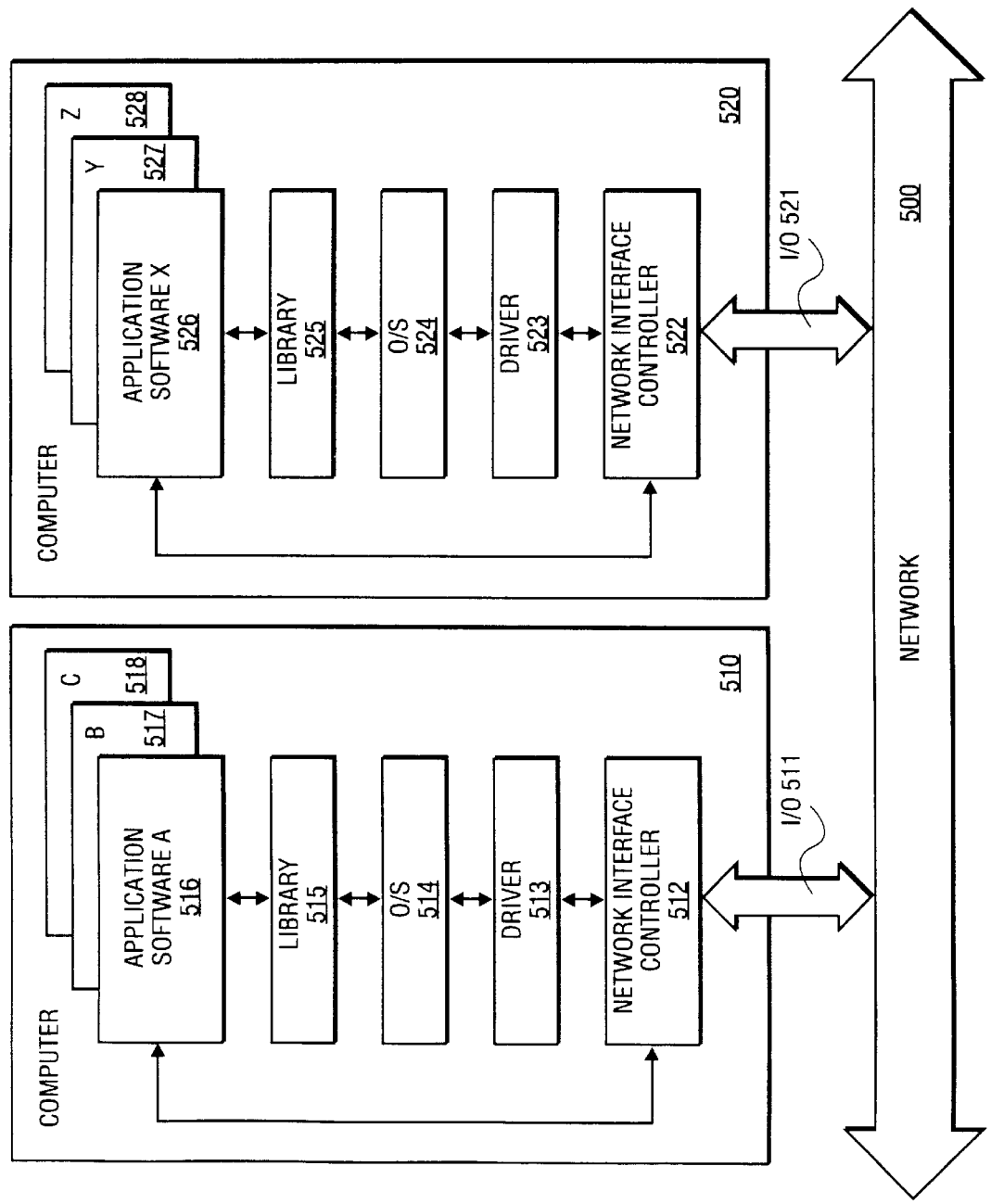
FIG. 5(a) is a block diagram of multi-tasking networked computers capable of implementing the present invention.

FIG. 5(a) shows a block diagram of multi-tasking networked computers capable of using programmed I/O to send and receive information, or messages. For example, the first computer 510 contains several applications A, B, C (516, 517, 518). The applications (516, 517, 518) are coupled to a library 515, an O/S 514, a driver 513 and a network interface controller (NIC) 512. In addition, the applications (516, 517, 518) have direct access to the network interface controller 512. The network interface controller (NIC) 512 is coupled to the I/O port 511 which is coupled to the network 500.

Figure 5B:
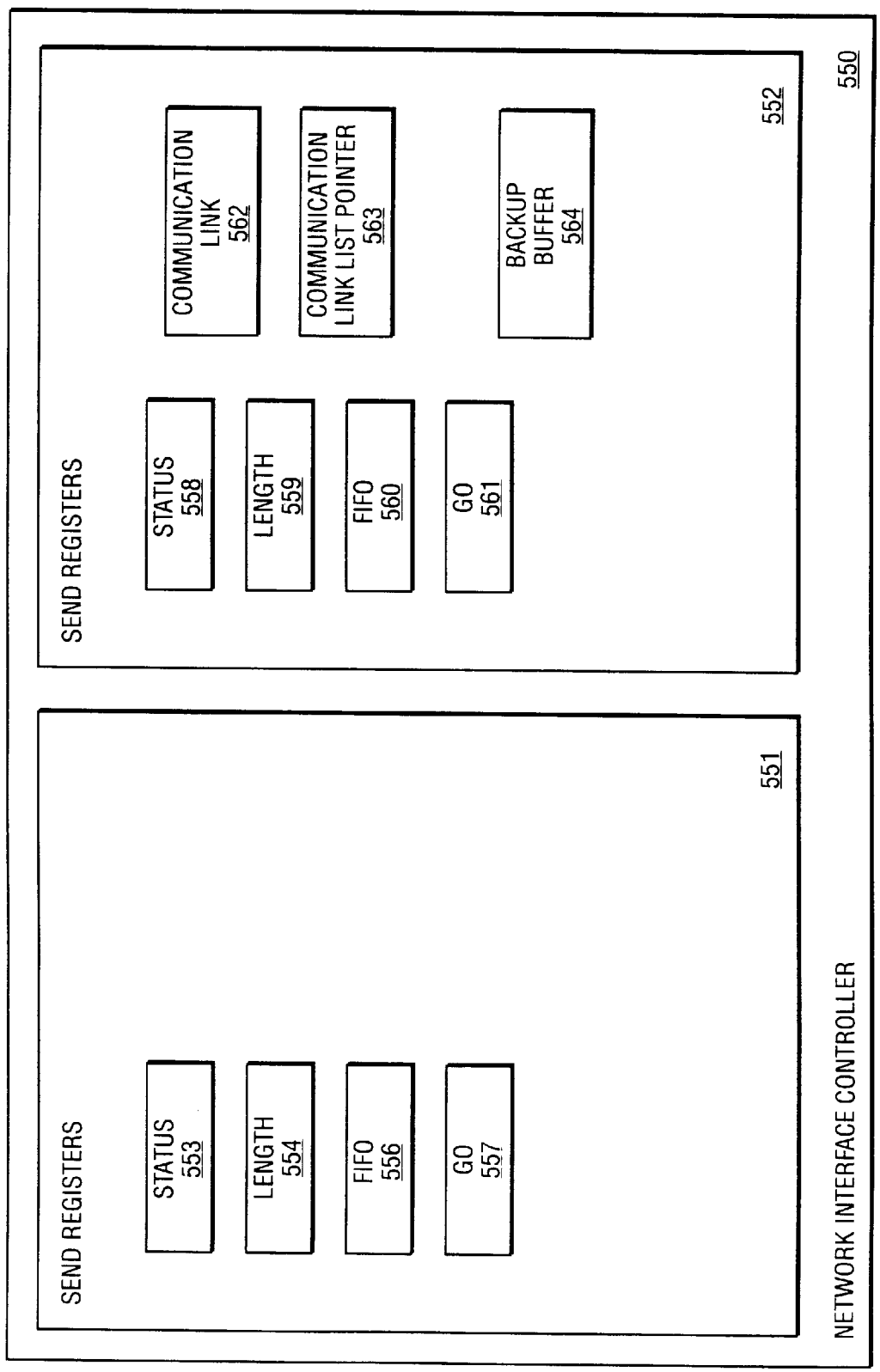
FIG. 5(b) is a block diagram of the Network Interface Controller of FIG. 5(a).

FIG. 5(b) is a block diagram of the Network Interface Controller (NIC) of FIG. 5(a). The NIC contains two main parts, the send registers 551 and the receive registers 552. The send registers 551 include a status register 553, a length register 554, a FIFO 556 and a go register 557. The receive registers 552 include a status register 558, a length register 559, a FIFO 560, a ready register 561, a communication link register 562, a communication link list pointer 563 and a backup buffer 564.

Figure 6:
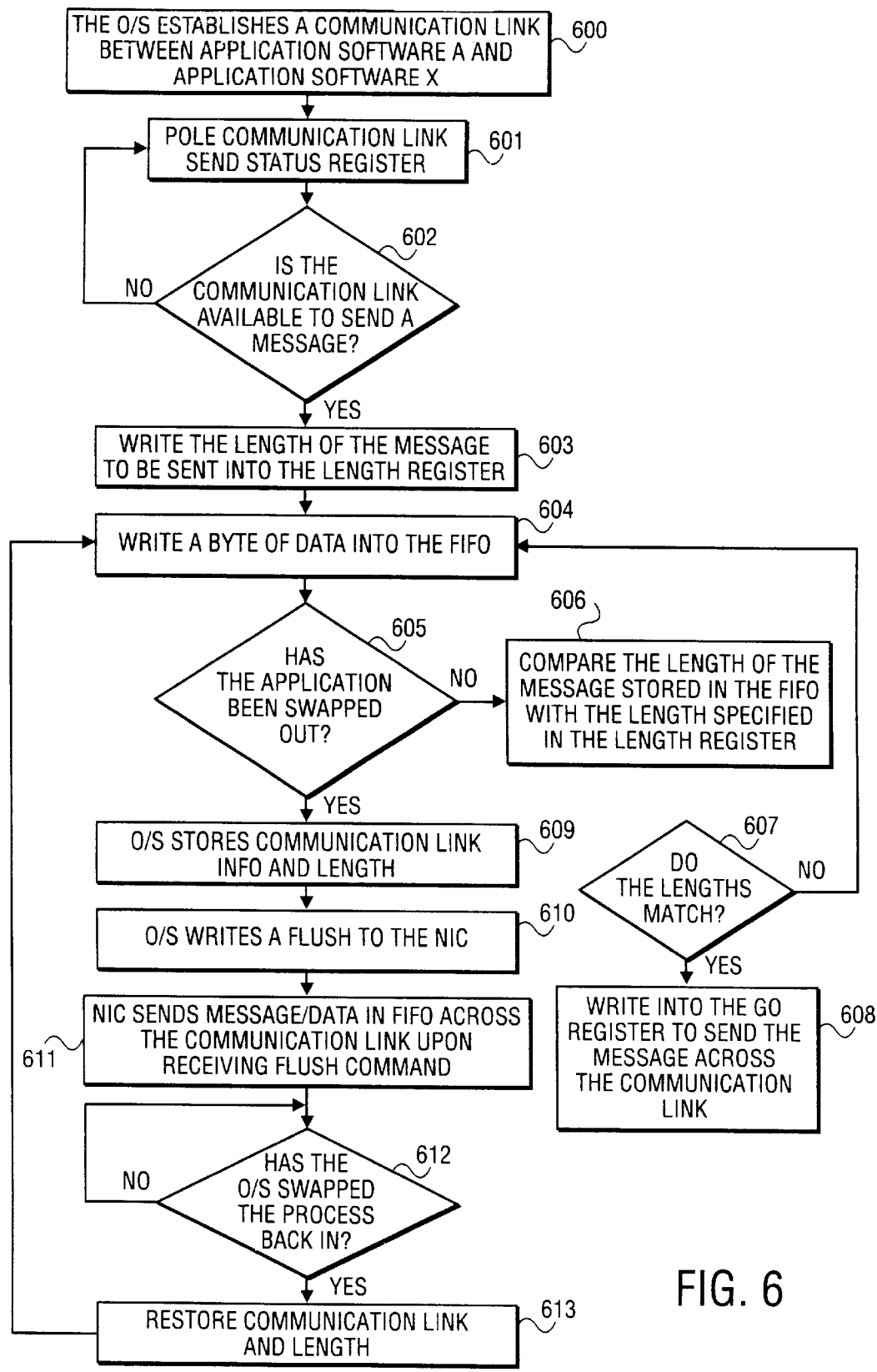
FIG. 6 is a flow chart illustrating a message send from application software A to application software X, both of FIG. 5.

FIG. 6 shows a flow chart of a message send in the system shown in FIG. 5, where the message is being sent from application software A to application software X. The first step is for a communication link, such as a virtual connection or virtual channel, to be established by the O/S between application software A and application software X. (step 600) Establishing the communication link, such as a virtual connection or virtual channel, can be done using asynchronous transfer mode (ATM), or some other method. Once the communication link between application software A and application software X has been established, then the communication link should be polled by looking at the status register to determine if the communication link is available to send a message. (step 601) If the communication link is not available, then the communication link should be polled again (return to step 601). If the communication link is found to be available, then move to step 603. (step 602) In step 603, the length of the message to be sent is written into the length register in the send register portion of the NIC. Then a byte of data should be written into the send FIFO in the NIC. (step 604) In step 605 if the O/S has not swapped out the current process (application), then the length of the message stored in the FIFO is compared to the length specified in the length register (step 606). If the lengths match (step 607) then the go register is written to and the message is sent across the communication link via the network. (step 608) However, if the lengths do not match, then return to step 604 and write another byte of data into the FIFO. After a byte of data is written, then move to step 605 where, if the O/S has swapped out the current process, then the O/S stores the communication link information, the communication link list pointer and the length. (step 609) The O/S then writes a flush command to the GO register. (step 610) Upon receiving the flush command, the NIC sends the message stored in the FIFO, even though it is not a complete message, cross the communication link via the network according to network protocol. (step 611) While the application software A is swapped out, it is inactive. (step 612) When the application software A is swapped back in then the O/S restores the communication link and the length information (step 613), and the application returns to step 604 in which it writes another byte of data into the FIFO as if it had never been interrupted. In the case in which the message is long, the O/S may swap the application software A out again. If this occurs, then, as described above, the portion of the message that has been written into the FIFO is sent. This is repeated until all the message has been sent.

Figure 7A:
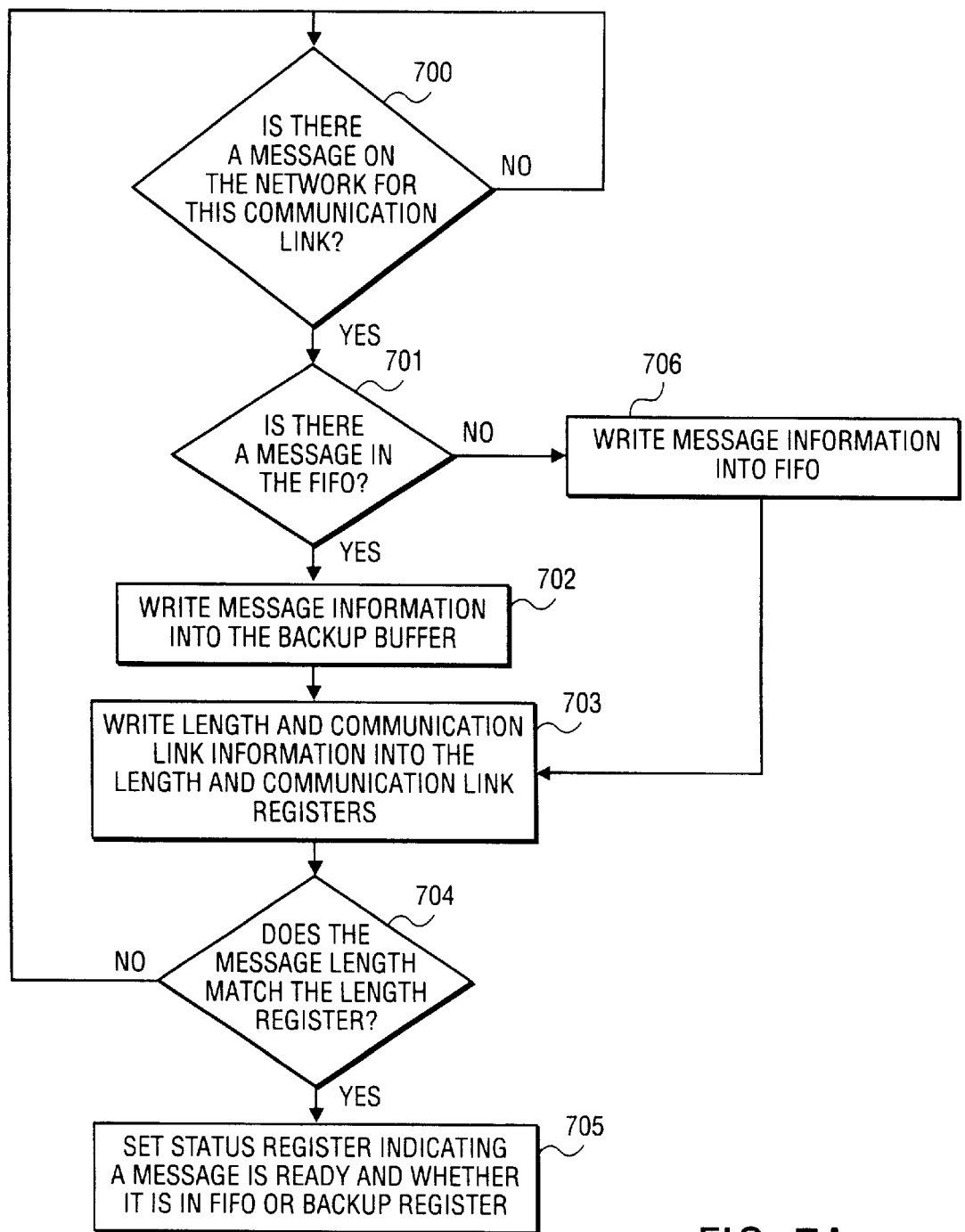
FIG. 7(a) is a flow chart illustrating the portion of a message receive by application software X from application software A, both of FIG. 5, in which the message is stored into the NIC.
Figure 7B:
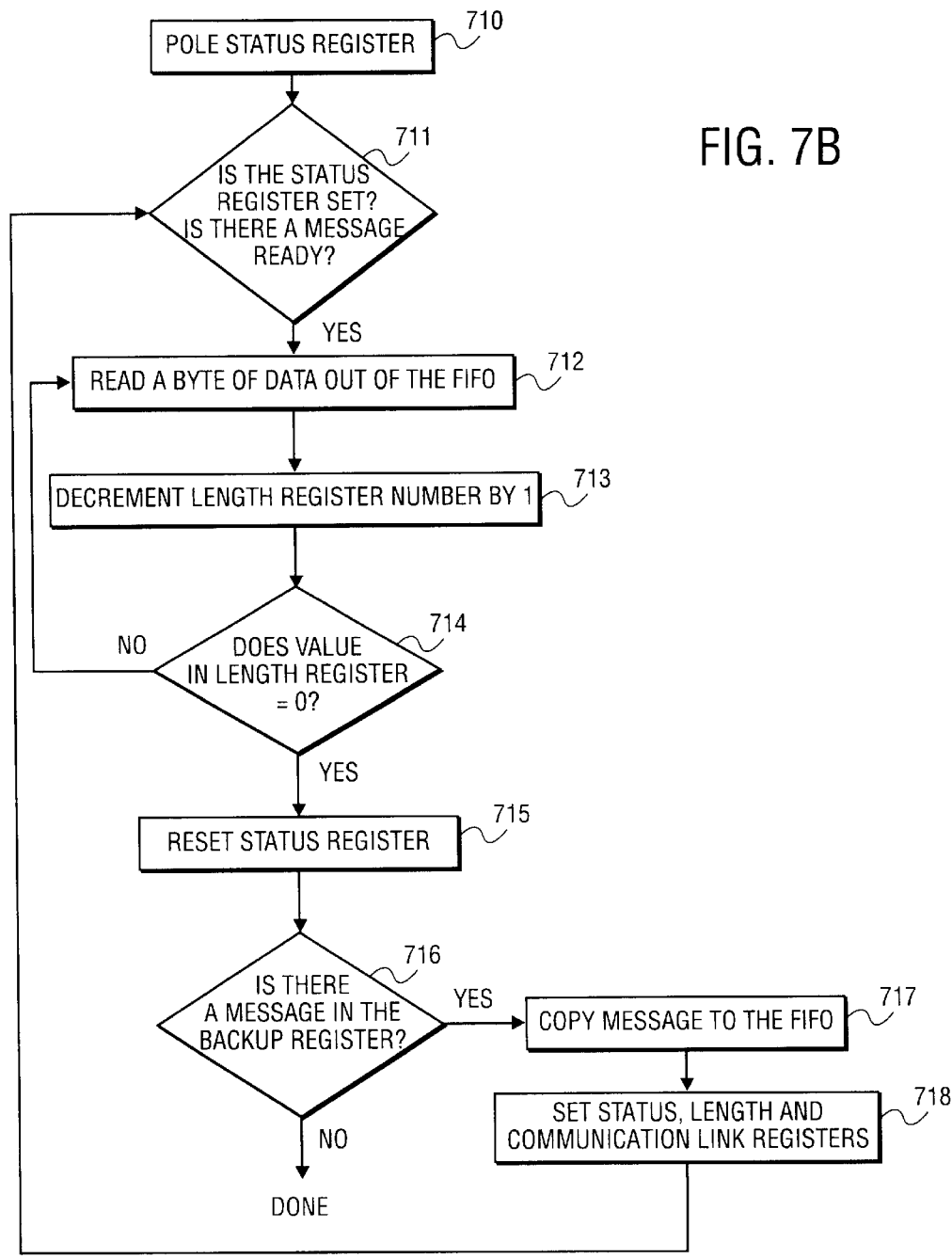
FIG. 7(b) is a flow chart illustrating the portion of a message receive by application software X from application software A, both of FIG. 5, in which the application software X receives the message from the NIC.

FIG. 7(a) and FIG. 7(b) shows a flow chart of a message receive in the system shown in FIG. 5, where the message is being sent from application software A to application software X. In step 700, the NIC checks to see if a message has been received by the computer. If a message has not been received then the system simply. returns to step 700 and waits for a message. However, if a message has been received by the computer, then there is an inquiry as to whether the FIFO has a message in it already. (step 701) If there is already a message in the FIFO, then the data is written into the backup buffer (step 702) otherwise it is written into the receive FIFO. (step 706) The length and communication link information included in the message is then written into the receive length and communication link registers. (step 703) Step 704 then inquires as to whether the data length of the message received matches the length stored in the length register. If the lengths does not match, then return to step 700, and wait for another message to be received by the computer, as the entire message has not been received. If the lengths match, then the status register is set, indicating that is message is now ready for the application software X (as indicated by the communication link information). (step 705) Asynchronously to the above events application software X pole the status register. (step 710) If the status register is not set (step 711), then there isn't a message waiting for application X, so it returns to step 710. However, if the status register is set (step 711), indicating that there is a waiting message, then application software X reads a byte of data from the FIFO. (step 712) The value in the length register is then decremented by 1. (step 713) If the value in the length register is not 0 (step 714) then return to step 712 and read another byte of data. However, if the value in the length register is 0 (step 714) then the status register is reset. (step 715) Next, there is an inquiry as to whether there is a message in the backup register. (step 716) If there is not a message in the backup register, then the application software X is done. If there is a message in the backup register, then the message is copied into the FIFO (step 717) and the status register, length register and communication link register is set with the information corresponding to the message. (step 718)

What is claimed is:

1. A method, comprising:
   establishing a communication link between a first application of a first networked computing device and a second application of a second networked computing device to send a message from the first application, the message having a message length;
   using programmed I/O and not direct memory access (DMA) to receive bytes of information from the first application until the first application has been swapped out by a multitasking operating system or until the entire message has been received;
   if the first application is swapped out by the multi-tasking operating system before the entire message was received,
      storing characteristics of the communication link and the message length,
      sending the received bytes of information across the communication link to the second networked computing device, and
      continuing to receive bytes of information from the first application when the first application is swapped in by the operating system.

2. The method of claim 1 further comprising:
   storing the received bytes of information from the first application; and
   determining whether the entire message has been received, and if so, then sending the entire message across the communication link to the second networked computing device.

3. The method of claim 1, wherein:
   responsive to the first application being swapped in, the communication link and the message length are restored using the stored characteristics of the communication link and the stored message length.

4. The method of claim 1, wherein establishing the communication link comprises:
   establishing a virtual connection between the first application and the second application.

5. The method of claim 1, further comprising:
   polling the communication link to determine when the communication link is available to send the message.

6. A computer readable medium comprising instructions encoded thereon, said instructions capable, when executed by a processor, of directing the processor to:
   establish a communication link between a first application of a first computing device and a second application of a second computing device to send a message from the first application, the message having a message length;
   receive bytes of information using programmed I/O and not using direct memory access (DMA) from the first application until the first application has been swapped out by a multi-tasking operating system or until the message has been received in its entirety; and
   if the first application is swapped out by the multitasking operating system before the entire message is received, then
      store characteristics of the communication link and the message length,
      send the received bytes of information across the communication link to the second computing device, and
      continue to receive bytes of information from the first application when the first application is swapped in by the multi-tasking operating system.

7. The medium of claim 6, wherein said instructions for receiving bytes of information using programmed I/O and not using DMA from the first application program include further instructions capable of directing the processor to:
   responsive to the first application being swapped in, restore the communication link and the message length using the stored characteristics of the communication link and the stored message length; and
   determine whether the entire message has been received, and if so, then send the received bytes of information across the communication link.

8. The medium of claim 6, wherein the instructions for establishing the communication link comprises further instructions capable of directing the processor to:
   establish a virtual connection between the first application and the second application.

9. The medium of claim 6, further comprising instructions capable of directing the processor to:
   poll the communication link to determine when the communication link is available to send the message.

10. A readable medium having instructions encoded thereon capable, when executed by a processor, of directing the processor to:
    establish a communication link between a first application of a first networked computing device and a second application of a second networked computing device to send a message;
    use programmed I/O and not direct memory access (DMA) to receive bytes of information in the message from the first application until the first application is swapped out by a multi-tasking operating system or until the entire message has been received, wherein the received bytes of information are stored into a storage device;

responsive to the first application being swapped out, store characteristics of the communication link and a message length of the message, and send the stored bytes of information across the communication link to the second networked computing device;

responsive to the first application being swapped in, restore the communication link and the message length using the stored characteristics of the communication link and the stored message length, and continue to receive bytes of information from the first application and to store the received bytes of information into the storage device; and determine whether the entire message has been received from the first application, and if so, then send the stored bytes of information across the communication link to the second networked computing device.

11. The medium of claim 10, further comprising instructions to poll the communication link to determine when the communication link is available for the message to be sent from the first application.

12. A system comprising:

a first computing device configured with a network interface and a first processor for executing a multi-tasking operating system supporting programmed I/O with the network interface;

a first intergrated circuit disposed within the first computing device and configured to establish a communication link, over the network interface, between a first application being executed by the first processor, and a second application being exectuted by a second processor of a second computing device;

a second intergrated circuit disposed within the first computing device and configured to receive bytes of information using programmed I/O and not using direct memory access (DMA) from the first application until the first application has been swapped out by said multi-tasking operating system or until the message has been received in its entirety; and a third integrated circuit disposed within the first computing device and configured to send said received bytes of information to the second application over the communication link, wherein, responsive to the first application being swapped out by said multi-tasking operating system, characteristics of the communication link and a message length of the message are stored, and the received bytes of information are sent across the communication link by the third integrated circuit.

13. The system of claim 12, wherein said second integrated circuit is further configured to:

write the received bytes of information into a storage device;

responsive to the first application being swapped in, restore the communication link and the message length according to said stored communication link characteristics and said stored message length, and continue said receiving bytes of information and writing the received bytes of information into the storage device; and determine whether the entire message has been written into the storage device, and if so, send the stored bytes of information across the communication link.

14. A method, comprising:

establishing a communication link between a first application of a first networked multi-tasking computer and a second application of a second networked multi-tasking computer to send a message;

using programmed I/O and not direct memory access (DMA) to receive bytes of information in the message from the first application until the first application is swapped out by a multi-tasking operating system or until the entire message has been received, wherein the received bytes of information are stored into a storage device;

responsive to the first application being swapped out, storing characteristics of the communication link and a message length of the message, and sending the stored bytes of information across the communication link to the second networked computing device;

responsive to the first application being swapped in, restoring the communication link and the message length using the stored characteristics of the communication link and the stored message length, and continuing to receive bytes of information from the first application and to store the received bytes of information into the storage device; and determining whether the entire message has been received from the first application, and if so, then sending the stored bytes of information across the communication link to the second networked computing device.

15. The method of claim 14, further comprising determining when the communication link is available for the message to be sent from the first application.

* * * * *